US 9,558,210 B1
(12) United States Patent
Tomkins et al.

(10) Patent No.: US 9,558,210 B1
(45) Date of Patent: Jan. 31, 2017

(54) DETERMINING THE QUALITY OF LOCATIONS BASED ON TRAVEL TIME INVESTMENT

(71) Applicant: Google Inc., Mountain View, CA (US)

(72) Inventors: Andrew Tomkins, Menlo Park, CA (US); Sergei Vassilvitskii, New York, NY (US); Shanmugasundaram Ravikumar, Berkeley, CA (US); Mohammad Mahdian, Santa Clara, CA (US); Bo Pang, Sunnyvale, CA (US); Prabhakar Raghavan, Saratoga, CA (US)

(73) Assignee: Google Inc., Mountain View, CA (US)

( * ) Notice: Subject to any disclaimer, the term of this patent is extended or adjusted under 35 U.S.C. 154(b) by 554 days.

(21) Appl. No.: 13/833,743

(22) Filed: Mar. 15, 2013

(51) Int. Cl.
*G06F 7/00* (2006.01)
*G06F 17/30* (2006.01)

(52) U.S. Cl.
CPC ..... *G06F 17/30241* (2013.01); *G06F 17/3087* (2013.01)

(58) Field of Classification Search
CPC ............ G06F 17/3087; G06F 17/30241; G06F 17/30265; G06F 17/30864; H04W 4/02
USPC .......................................................... 707/724
See application file for complete search history.

(56) References Cited

U.S. PATENT DOCUMENTS

| | | | |
|---|---|---|---|
| 2003/0036848 A1* | 2/2003 | Sheha et al. | 701/209 |
| 2007/0174299 A1* | 7/2007 | Kuang et al. | 707/10 |
| 2007/0293958 A1* | 12/2007 | Stehle et al. | 700/30 |
| 2008/0104055 A1* | 5/2008 | Segel | 707/5 |
| 2009/0319172 A1* | 12/2009 | Almeida et al. | 701/201 |
| 2010/0235077 A1* | 9/2010 | Chan | 701/200 |
| 2011/0238288 A1* | 9/2011 | Li et al. | 701/201 |
| 2012/0016678 A1* | 1/2012 | Gruber et al. | 704/275 |
| 2012/0130636 A1* | 5/2012 | Westerlage | 701/517 |
| 2012/0143810 A1* | 6/2012 | Berg-Sonne | 706/47 |
| 2013/0191215 A1* | 7/2013 | Metcalf | 705/14.58 |
| 2013/0345961 A1* | 12/2013 | Leader et al. | 701/410 |
| 2014/0278071 A1* | 9/2014 | San Filippo et al. | 701/465 |

OTHER PUBLICATIONS

Horozov et al., Using location for personalized POI recommendations in mobile environments, http://ieeexplore.ieee.org/xpls/abs_all.jsp?arnumber=1581323, Conference: Jan. 23-27, 2006 Phoenix, AZ, pp. 1-7.*

(Continued)

*Primary Examiner* — Sherief Badawi
*Assistant Examiner* — Lin Lin Htay
(74) *Attorney, Agent, or Firm* — Middleton Reutlinger

(57) ABSTRACT

Methods and apparatus related to associating a quality measure with a given location. For example, an anticipated distance value for a given location may be identified that is indicative of anticipated time and/or distance to reach the given location. At least one actual distance may be identified that is indicative of actual time for the one or more members to reach the given location. In some implementations, the anticipated/actual distance values may include one or more distributions. A quality measure is then determined based on a comparison of the anticipated distance value and the identified actual distance value. The quality measure is associated with the given location. The quality measure may be further based on additional factors.

23 Claims, 4 Drawing Sheets

(56) References Cited

OTHER PUBLICATIONS

Stiller et al. (Towards Spatial Awareness in Recommender Systems, http://ieeexplore.ieee.org/xpls/abs_all.jsp?arnumber=5402633 &tag=1, IEEE, Conference in London Nov. 9-12, 2009, pp. 1-7.*
Zheng et al., Collaborative Location and Activity Recommendations with GPS History Data, International World Wide Web Conference Committee (IW3C2), WWW 2010, Apr. 26-30, 2010, Raleigh, North Carolina, USA. ACM 978-1-60558-799—Aug. 10, 2004.*

* cited by examiner

DETERMINING THE QUALITY OF LOCATIONS BASED ON TRAVEL TIME INVESTMENT

BACKGROUND

This specification is directed generally to determining a quality measure of a given location, and more particularly, to determining the quality measure of a given location based on the time investment one or more users is willing to make to visit the given location.

Quality measures for locations are often based on one or more reviews related to the locations. For example, user reviews and/or professional reviews may be utilized to determine a quality measure for a given location. The quality measures may be associated with the given location in a database and may be utilized by one or more applications and/or provided to a user. For example, a user search for restaurants in a particular area may return search results for restaurants that are ranked based on the quality measure and/or that are displayed in combination with an indication of the quality measure. Indications of the quality measure may include a numerical rating, a number of stars, etc.

SUMMARY

The present disclosure is directed to methods and apparatus for determining the quality measure of a given location. In some implementations, the quality measure of a given location may be determined based on the time investment a user is willing to make to visit the given location. For example, the time investment for a given location may be based on comparison of one or more actual distance values to reach the given location to one or more anticipated distance values to reach the given location. The actual distance values are indicative of actual time of one or more users to reach the given location and the anticipated distance values are indicative of anticipated time to reach the given location. In some implementations, the anticipated distance value may be one or more distributions. Likewise, in some implementations, the actual distance value may be one or more distributions. Such distributions may be continuous and/or discrete. In some implementations, the quality measure may be based on additional factors such as one or more location characteristics of the given location and/or one or more user characteristics of the visitors to the given location.

In some implementations a computer implemented method may be provided that includes the steps of: identifying a given location; identifying at least one anticipated distance value for the given location, wherein the anticipated distance value is indicative of anticipated time to reach the given location; identifying, for one or more members in a population, at least one actual distance value, wherein each actual distance value is indicative of actual time for the one or more members to reach the given location; determining a quality measure for the given location based on a comparison of the anticipated distance value and the identified actual distance value; and associating the quality measure with the given location.

This method and other implementations of technology disclosed herein may each optionally include one or more of the following features.

The method may further include identifying a geographic region and identifying at least one region characteristic of the geographic region. Determining the quality measure for the given location may be based on the region characteristic of the geographic region. Determining the anticipated distance value may be based on the region characteristic of the geographic region. The region characteristic may include a population density of the region.

The method may further include identifying one or more location characteristics of the given location and determining the anticipated distance value for the given location based on the one or more location characteristics.

The method may further include identifying one or more user characteristics and selecting the members of the population based on whether they share the one or more user characteristics. The one or more user characteristics may include at least one of a semantically meaningful characteristic and a latent characteristic.

The method may further include identifying a first distance value and a second distance value and determining the actual distance value based on the first and second distance values. The first distance value may be indicative of actual time for the one or more members to reach the given location from an initial location and the second distance value may be indicative of actual time for the one or more members to reach a final location from the given location. Determining the actual distance value may include comparing the first and second distance values to an initial to final distance value. The initial to final distance value may be based on difference between the initial location and the final location. The method may further include identifying a third distance value for the one or more members in the population for which the first distance value and the second distance value are identified. The third distance value may be indicative of actual time for the one or more members to reach a second given location from the given location. The method may further include determining the actual distance value based on the first, second, and third distance values. The method may further include: identifying a second anticipated distance value for the second given location; identifying a second location actual distance value for the second given location based on the actual distance value; determining a quality measure for the second given location based on a comparison of the second anticipated distance value and the identified second location actual distance value; and associating the quality measure with the second given location.

The method may further include: identifying a plurality of additional locations; determining an additional quality measure for each of one or more additional locations in the plurality of additional locations; and ranking the given location and the one or more additional locations based on the respective quality measures. The method may further include ranking search result documents related to the given location and the one or more additional locations based on the respective quality measures.

The anticipated distance value and the actual distance value may be time values.

The anticipated distance value may include an indication of the anticipated number of individuals that would travel an anticipated time range to reach the given location; the actual distance value may include an indication of the actual number of the one or more members that traveled the anticipated time range to reach the given location; and determining the quality measure for the given location may be based on a comparison of the anticipated number of individuals that would travel the anticipated time range to reach the given location and the actual number of the one or more members that traveled the anticipated time range to reach the given location.

The method may further include: identifying, for the or more members, a rank indicative of the number of competing locations bypassed to reach the given location, wherein the determining the quality measure for the given location is further based on the identified rank.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process data to determine distances and/or time taken to travel to a given location. The data may be utilized by one or more quality measure engines to determine a quality measure for a given location. These determined distances and quality measures represent new aspects of a location that may be derived from positional data values associated with users. Particular implementations of the subject matter described herein may utilize quality measures to rank and/or rate search result documents based on the quality measures.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
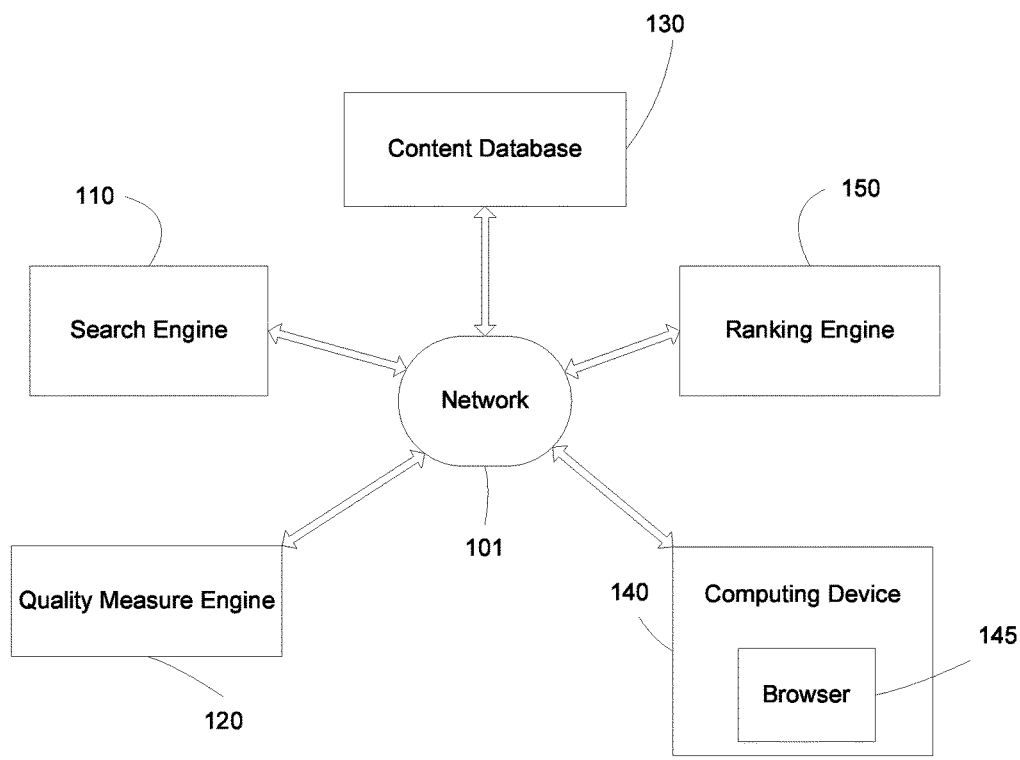
FIG. 1 is a block diagram of an example environment in which a quality measure of a location may be determined.

FIG. 1 illustrates a block diagram of an example environment 100 in which a quality measure of a location may be determined. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment also includes a search engine 110, a quality measure engine 120, a content database 130, a computing device 140, and a ranking engine 150.

The quality measure engine 120 may determine a quality measure of a given location based on a time investment one or more users are willing to make to visit the given location. As discussed herein, in some implementations the quality measure of a given location may optionally be based on additional factors such as reviews from one or more users about the given location, and/or pure popularity signals of the given location. In some implementations, determination of a quality measure of a given location based at least in part on a time investment one or more users are willing to make to visit the given location minimizes biases related to certain quality measures based solely on pure popularity signals and/or user reviews. For example, many locations receive visitors proportional to their number of seats and crowds adjust behavior based on availability. Thus, a pure popularity signal may not entirely capture the quality of such a location. Also, for example, a higher-end restaurant may attract much less traffic than a fast food restaurant, and a pure popularity signal may not capture the desirability of such a location.

The quality measure engine 120 and/or the search engine 110 may identify a given location and location data for the given location. In some implementations the given location may be a physical location such as a restaurant, a school, a hospital, a theater, a department store, or a laundry service. In some implementations the location may be identified via one or more databases such as content database 130. For example, in some implementations the database may include a listing of service entities associated with a physical location. The location data for the given location is indicative of the actual physical location of the given location. Location data may include, for example one or more of a textual address, a latitude longitude pair, and an address identifier. In some implementations the location data may be identified via one or more databases such as content database 130. For example, in some implementations the database may include a listing of service entities and location data for those service entities. For example, the quality measure engine 120 and/or the search engine 110 may identify an Italian restaurant in downtown Chicago and identify its physical address via a location database.

The quality measure engine 120 and/or the search engine 110 may also identify at least one anticipated distance value for the given location. Each anticipated distance value is indicative of the anticipated travel time that one or more users would be expected to invest to reach the given location. In some implementations, an anticipated distance value may be based on the time taken and/or distance traveled by an identified group of users to reach locations that share one or more characteristics with the given location. For example, the anticipated distance value may be the average time or the average distance traveled by an identified group of users in indicating travel to similar locations within a geographic area of the given location. Also, for example, the anticipated distance value may be the mean time or the mean distance traveled by an identified group of users in traveling to similar locations within a geographic area of the given location. In some implementations outliers may optionally be omitted in determining an anticipated value.

In some implementations the identified group of users may be, for example, all users whose initial location was within a certain geographic distance of the given location. For example, the users may be all users indicating travel to similar locations, wherein the users' initial locations were within 100 miles of the given location, within the same city as the given location, within the same state of the given location, and/or within the same country as the given location. In some implementations an anticipated distance value may provide an indication of the anticipated number of individuals that would travel an anticipated time range to reach the given location. For example, in some implementations the anticipated distance value may provide an indication of the percentage of users that would travel more than the statistical mean traveled by an identified group of users in traveling to similar locations within a geographic area of the given location. For example, the statistical mean for an identified group of users in traveling to similar locations within a geographic area of the given location may be identified as five miles, it may be determined that 40% of the users traveled more than five miles, and 40% may be identified as the anticipated distance value. Also, for example, in some implementations the anticipated distance value may provide an indication of the percentage of users indicating traveling more than 110% over the statistical mean traveled by an identified group of users in traveling to similar locations within a geographic area of the given location.

In some implementations multiple anticipated distance values may be identified for a given location. For example, in some implementations each anticipated distance value may provide an indication of the anticipated number of individuals that would travel an anticipated time range to reach the given location. For example, a first anticipated distance value may provide an indication of the anticipated number and/or percentage of users that would travel 0-1 minutes to reach a given location, a second anticipated distance value may provide an indication of the anticipated number and/or percentage of users that would travel 1-2 minutes to reach a given location, etc. Also, for example, a first anticipated distance value may provide an indication of the anticipated number and/or percentage of users that would travel less than 90% of a statistical mean traveled by an identified group of users in traveling to similar locations within a geographic area of the given location; a second anticipated distance value may provide an indication of the anticipated number and/or percentage of users that would travel within 90% and 110% of the statistical mean; and a third anticipated distance value may provide an indication of the anticipated number and/or percentage of users that would travel more than 110% of the statistical mean.

As one example, an anticipated distance value for an Italian restaurant in downtown Chicago may be identified based on indicated travel times of users in traveling to other restaurants in the same neighborhood as the Italian restaurant. For example, the anticipated distance value for the Italian restaurant may be based on average indicated travel times of users to other Italian restaurants that are in the same zip code as the Italian restaurant. Also, for example, the anticipated distance value for the Italian restaurant may be based on average indicated travel time of users to other restaurants that are in a similar price range as the Italian Restaurant and are within a two mile radius of the Italian restaurant. In some implementations, the anticipated distance value may be identified via one or more database such as content database 130. In some implementations the anticipated distance value for a given location may be identified based on actual location data of one or more users who have visited and/or indicated a likelihood of visiting a given location, such as all such users, users in a geographic region, and/or users with certain user characteristics. For example, in some implementations the anticipated distance value for a given location may be based on indicated travel times for a group of navigational queries in which the destination is a similar type of location within a certain distance of the given location.

In some implementations, the anticipated distance value may be represented as one or more distributions. Such distributions may be continuous and/or discrete. Additionally, and/or alternatively, in some implementations, one or more distribution may be represented using discrete values. In the example described earlier, the first, second, and third anticipated distance values may, in some implementations, be discrete values representing a continuous distribution.

In some implementations, an anticipated distance value for a location may additionally and/or alternatively be based on one or more characteristics of a region of the location, the users of the location, and/or the location itself. For example, the anticipated distance value of the identified location may be based on characteristics of a region associated with an identified location. For example, the anticipated distance value to a place serving breakfast in rural Utah may be much longer than the anticipated distance value to a breakfast place in Berkeley due to greater population density in Berkeley. Also, for example, the anticipated distance value for a breakfast place in Washington D.C. may take into account multiple transportation options (walking, car, bike, public transportation) whereas the anticipated distance value for a remote breakfast place may only take into account a single transportation option. Also, for example, the anticipated distance value to a location may be based on a number of competing locations that are geographically proximal to the location. For example, an anticipated distance value for a fine dining establishment in Washington D.C. may be based on the number of fine dining establishments that are within a given distance of the fine dining establishment (e.g., two miles, same neighborhood, same zip code).

Also, for example, the region characteristic may include one or more of the density of population in the region, the network of roads, network of sidewalks, network of public transportation options, traffic patterns, population density, the types and/or distribution of one or more locations, the types and distribution of members of the population, population demographic data, public transportation data, and income data for members of the population. One or more aspects of such geographic region characteristic may optionally be utilized in identifying an anticipated distance value. Additional and/or alternative geographic region characteristics may be provided.

A geographic region may include a zip code, a county, a business district, a city, a township, a municipal area, a state, and/or a country. For example, in some implementations, the geographic region may include one or more of the eastern, southern, Midwestern, southwestern, central, and/or pacific regions of the United States. Also, for example, other designations such as "small town", "medium-sized town", "small city", and "large city" may be used. In some implementations, the quality measure engine 120 may identify region characteristics from one or more sources such as mapping services, online web pages, tourist guides, government publications, census data, published brochures, weather data services, and news agencies. In some implementations the geographic region and/or geographic region characteristics may be identified via a database such as content database 130.

Also, for example, an anticipated distance value for an identified location may additionally and/or alternatively be based on one or more location characteristics of the identified location. For example, an anticipated distance value to a restaurant in Greenwich Village in New York may be much less than the anticipated distance value to a drive-through fast food restaurant in rural New York, based at least in part on the greater likelihood of individuals driving to the fast food restaurant (e.g., due to the drive-through, more parking spots). Also, for example, an anticipated distance value for a fine dining establishment may be greater than the anticipated distance value for a fast food restaurant due to a lower density of fine dining establishments relative to fast food restaurants.

In some implementations an anticipated distance value of an identified location may additionally and/or alternatively be based on user characteristics of users that have visited the identified location. For example, for a given restaurant in downtown Chicago, the anticipated distance value may take into account modes of transportation of visitors to the location. For example, if 50% of visitors are identified as walkers and 50% of visitors are identified as public transportation users, then the anticipated distance value may take into account differences in distance and/or time between the walkers and the public transportation users. For example, the anticipated distance value may be based on an average of walking and public transportation anticipated distance values. Also, for example, in some implementations different anticipated distance values may be defined for different groups based on the mode of transportation associated with the group such as walking, biking, car, and/or public transportation. For example, a first anticipated distance value may be identified for walkers and a second anticipated value may be identified for bus riders. In some implementations, the anticipated distance value may be determined by the quality measure engine 120 based on data from the content database 130. Additional and/or alternative methods of determining anticipated distance values may be utilized.

The quality measure engine 120 may also identify at least one actual distance value for a given location for each of one or more members in a population. Each actual distance value for a given location is indicative of actual time for the respective member to reach the given location. For example, the search engine 110 may identify residents of Chicago that have indicated a visit to the Italian restaurant in downtown Chicago and determine the anticipated and/or actual time taken for each such resident to reach the restaurant. For example, in some implementations an actual distance value for one or more residents may be based on time and/or distance from an initial user location to the restaurant. Also, for example, in some implementations an actual distance value for one or more residents may be based on time and/or distance from the restaurant to a final user location. Also, for example, in some implementations an actual distance value for one or more residents may be based on an average of time and/or distance from an initial location to the restaurant and from the restaurant to a final user location.

In some implementations, the actual distance value may be represented as one or more distributions. Such distributions may be continuous and/or discrete. Additionally, and/or alternatively, in some implementations, one or more distributions may be represented using discrete values.

In some implementations, the anticipated distance value and/or the actual distance value may be determined by the quality measure engine 120. In some implementations the quality measure engine 120 may identify the anticipated distance value and/or the actual distance value from a database such as content database 130. In some implementations search engine 110 may identify one or more of the anticipated distance values and actual distance values for one or more locations and provide the values to content database 130.

In some implementations anticipated distance values and/or actual distance values for a given location may be based on one or more distances and/or times determined via a mapping system. For example, in some implementations an actual distance value for a given location may be based on a navigational query of one or more users of a mapping service seeking directions to the given location. For example, the actual distance value may be based on an average travel distance of a plurality of navigational queries of a mapping service seeking directions to the given location. Also, for example, in some implementations an anticipated distance value for a given location may be based on a plurality of navigational queries of a mapping service seeking directions to other locations that are geographically proximal to the given location. For example, the anticipated distance value may be based on a mean of the distance of a plurality of navigational queries of a mapping service seeking directions to similar locations within one mile of the given location. In some implementations, one or more of the anticipated distance value and/or the actual distance values may be compared by the search engine 110 and/or quality measure engine 120 and stored in the content database 130.

In this specification, the term "database" will be used broadly to refer to any collection of data. The data of the database does not need to be structured in any particular way, or structured at all, and it can be stored on storage devices in one or more locations. Thus, for example, the content database 130 may include multiple collections of data, each of which may be organized and accessed differently.

The quality measure engine 120 determines a quality measure for the given location based on a comparison of the anticipated distance value and the identified actual distance value. In some implementations, the quality measure may be based on subtracting the anticipated distance value from the actual distance value. For example, if the actual distance value for a given location is equal to or within a certain range of the anticipated distance value, then it may be determined that users are traveling an expected distance to visit and an average quality measure may be associated with the given location. Also, for example, if the actual distance value for a given location is greater than the anticipated distance value and outside of the certain range of the anticipated distance value, then it may be determined that users are going out of their way to visit and a quality measure indicative of high quality may be associated with the given location. Also, for example, if the actual distance value for a given location is less than the anticipated distance value and outside of the certain range of the anticipated distance value, then it may be determined that users are not going even the average distance to visit and a quality measure indicative of low quality may be associated with the given location.

When a certain range is utilized, the certain range may be based on a number of factors including, for example, the statistical variance from any determined anticipated distance value. For example, a determined anticipated distance value may be a statistical mean that is one mile, and may be associated with one standard deviation that includes distance values between 0.8 miles and 1.2 miles, and the range may include values between 0.8 miles and 1.2 miles. In some implementations, the system may compute a weighted difference of the actual distance value and the anticipated distance value. Other relevant comparisons may also be used.

For example, the quality measure engine 120 may identify at least one anticipated distance value X. For example, the anticipated distance value for the Italian restaurant in downtown Chicago may be identified as 10 minutes (X=10 minutes). The quality measure engine 120 may also identify an actual distance value Y for one or more users. For example, an average actual distance value for a group of users to travel to the Italian restaurant may be identified as Y=20 minutes. In some implementations the quality measure engine 120 may determine the quality measure based on the difference Y−X=10 minutes. In some implementations the actual distance value and/or the anticipated distance value may additionally and/or alternatively be based on distance. For example, the actual distance value may be two miles or may be based on a combination of the distance and the time.

In some implementations, the quality measure engine 120 may identify actual visits by n users to the Italian restaurant, and identify actual distance values $Y_1, Y_2, \ldots, Y_n$ for each of the n users visiting the Italian restaurant.

In some implementations the quality measure engine 120 may identify the average Y of the actual distance values $Y_1$, $Y_2, \ldots, Y_n$. The quality measure engine 120 may then determine the quality measure based on comparison of the average Y and X (e.g., Y–X, wherein a greater score is more indicative of quality). In some implementations the quality measure engine 120 may identify the mean Y of the actual distance values $Y_1, Y_2, \ldots, Y_n$. The quality measure engine 120 may then determine the quality measure based on comparison of the mean Y and X (e.g., Y–X, wherein a greater score is more indicative of quality). Any average, mean, and/or other statistical calculation may optionally remove outliers.

In some implementations, the quality measure engine 120 may determine the quality measure based on an average of the differences $Y_1-X, Y_2-X, \ldots, Y_n-X$. For example, in some implementations, the quality measure engine 120 may identify a distribution for the differences $Y_1-X$, $Y_2-X, \ldots, Y_n-X$ and use the distribution to determine a quality measure.

In some implementations, the quality measure engine 120 may identify one or more ranges and identify how many of the differences $Y_1-X, Y_2-X, \ldots, Y_n-X$ fall within each range. The quality measure engine 120 may use this data to determine a quality measure. For example, the quality measure engine 120 may determine how many of the differences $Y_1-X, Y_2-X, \ldots, Y_n-X$ indicate an investment value that satisfies a threshold. For example, it may be determined how many of the differences indicate an investment value that is 20% greater than an anticipated distance value, at least 10 minutes more than an anticipated distance value, and/or is at least 2 miles more than an anticipated distance value. The quality measure may be based on a number and/or percentage of the difference that satisfy the threshold. For example, if 50% of the differences for restaurant A satisfy the threshold it may be indicative of a higher quality measure than if only 10% of the differences satisfied the threshold. In some implementations the threshold may be based on a geographic region characteristic of a given location. For example, in a rural area a threshold of 10 miles may be considered appropriate whereas in Manhattan a threshold of 5 miles may be considered appropriate.

In some implementations multiple ranges may additionally and/or alternatively be utilized. For example, the ranges for the Italian restaurant in downtown Chicago may be identified as (–10) minutes to (–1) minutes, (–1) minute to 1 minute, 1 to 10 minutes, and 10 minutes or more. The quality measure engine 120 may identify that, 30% of the users were within the (–10) to (–1) minutes range, 5% of the users were within the (–1) minute to 1 minute range, 35% of the users were within the 1 to 10 minutes range, while the remaining 30% of the users were in the 10 minutes or more range. In some implementations the ranges may be based on a geographic region characteristic of a given location.

Various methods and/or apparatus may be utilized to determine quality measure based on such a distribution. For example, quality measure may be based on the percentage of users determined to have traveled greater than 1 minute over the Y value to have reached the given location. For example, assuming a quality weighting of 0 to 1, the quality may be identified as 1*(percentage of the users were determined to have traveled greater than 1 minute over the Y value), which would equal 0.65 in the above example. Also, for example, assuming a quality weighting of 0 to 1, the quality may be identified as [(–0.5*percentage of users within the (–10) to (–1) minutes range)+(0.6*percentage of users within the (–1) to 1 minutes range)+(0.85*percentage of users within the 1 to 10 minutes range)+(1*percentage of users in the 10 minutes or over range), which would equal 0.775 in the above example. Additional and/or alternative determinations of quality measure may be made based on distributions.

Also, for example, in some implementations, the quality measure engine 120 may determine the quality measure based on comparison of a plurality of anticipated distance values for a given location and a plurality of actual distance values for the given location. For example, in some implementations the quality measure engine 120 may identify multiple anticipated distance values for a given location, with each indicating an anticipated percentage of users that have anticipated travel times within a certain range. For example, anticipated distance values $X_1, X_2, \ldots, X_n$ may be identified for ranges $R_1, R_2, \ldots, R_n$. For example, $X_1$ may be identified as 15% for an $R_1$ of 0 minutes to 1 minutes; $X_2$ may be identified as 30% for an $R_2$ of 1 minute to 4 minutes; $X_3$ may be identified as 25% for an $R_3$ of 4 minutes to 6 minutes; and $X_4$ may be identified as 30% for an $R_4$ of 6 minutes or more. Additional and/or alternative granularities of time ranges may be utilized. Multiple actual distance values may also be identified for ranges $R_1, R_2, \ldots, R_n$. For example, actual distance values $Y_1, Y_2, \ldots, Y_n$ may be identified for ranges $R_1, R_2, \ldots, R_n$. For example, $Y_1$ may be identified as 40% for an $R_1$ of 0 minutes to 1 minutes; $Y_2$ may be identified as 5% for an $R_2$ of 1 minute to 4 minutes; $Y_3$ may be identified as 5% for an $R_3$ of 4 minutes to 6 minutes; and $Y_4$ may be identified as 50% for an $R_4$ of 4 minutes to 6 minutes; etc. One or more of the actual distance values may be compared to one or more of the anticipated distance values to determine a quality measure. For example, in some implementations $Y_4$ may be compared to $X_4$ to determine a quality measure. For example, it may be determined that $Y_4$ is at least a threshold greater than $X_4$ and a quality measure indicative of quality should therefore be assigned with the given location. Also, for example, in some implementations each of $X_1, X_2, \ldots, X_n$ may be compared to each of $Y_1, Y_2, \ldots, Y_n$ to determine a quality measure. Additional and/or alternative comparisons may be made.

For example, the given location may be an upscale restaurant in downtown Chicago, and an analysis of the difference $Y_1-X_1$ may indicate that the difference may be a result of the restaurant sharing the same building with an office with highly paid employees. Likewise, an analysis of the difference $Y_4-X_4$ may indicate that the restaurant is also popular among employees from another office building a couple of blocks away.

Also, for example, in some implementations, the quality measure engine 120 may determine the quality measure based on comparison of a plurality of anticipated distance values for a given location and a plurality of actual distance values for the given location, where one or more anticipated/actual distance values in the plurality of anticipated/actual distance values may be a distribution. For example, the anticipated distance value may be a discrete distribution $X=(X_1, X_2, \ldots, X_n)$ and the actual distance value may be a discrete distribution $Y=(Y_1, Y_2, \ldots, Y_n)$, where $X_1$, $X_2, \ldots, X_n, Y_1, Y_2, \ldots, Y_n$ may be determined as explained in the previous example. In some implementations, X and Y may be continuous distributions. In some implementations, the anticipated distance value may be a vector distribution $\underline{X}=(X_1, X_2, \ldots, X_n)$, and the actual distance value may be a vector distribution $\underline{Y}=(Y_1, Y_2, \ldots, Y_n)$, where one or more of $X_1, X_2, \ldots, X_n, Y_1, Y_2, \ldots, Y_n$, is a discrete and/or continuous distribution.

In some implementations, the quality measure engine 120 optionally adjusts the quality measure, determines additional characteristics about a location, and/or associates a determined quality measure with one or more users based on one or more user characteristics. For example, in some implementations quality measure engine 120 may determine one or more characteristics of a given location based on a distribution of differences between anticipated distance values and actual distance values. For example, if one or more distribution grouping contains a substantial number of users having a common characteristic it may provide an indication that the common characteristic is indicative of user's who place quality in the location. For example, if 90% of the users in the over 10 minutes range are in an age range of 25-35, but do not make up a disproportionate amount of the other ranges, it may indicate that 25-35 year olds associate this restaurant with high quality.

Also, for example, the quality measure engine 120 may associate an adjusted quality measure with one or more users based on one or more user characteristics. For example, if 90% of the users in the over 10 minutes range are in an age range of 25-35, but do not make up a disproportionate amount of the other ranges, it may associate a higher quality measure with the given location for those users who are in an age range of 25-35 than it would for those users who are not in that age range.

In some implementations, one or more actual distance values may be weighted and/or the differences based on such actual distance values may be weighted. For example, in implementations in which an average actual distance value is determined based on data from a plurality of users, the average actual distance value may be weighted more heavily in favor of data associated with certain users. For example, the average actual distance value for a given location may be weighted more heavily in favor of data associated with users for whom it can be verified they actually visited the given location as compared to those who just provided an indication of intent to visit the given location. Also, for example, in implementations in which a plurality of differences are determined between an anticipated distance value and an actual distance value, certain differences may be weighted more heavily in favor of actual distance values associated with certain users.

In some implementations, the quality measure engine 120 optionally weights one or more actual distance values differently based on the initial location and/or the final location associated with the distance values. For example, a first user who travels two miles more than an anticipated distance value to visit an Italian restaurant in downtown Chicago may take a path wherein he passes (or comes within a defined diversion distance of) three different Italian restaurants on his way to the Italian restaurant. The actual distance value of the first user travelling two miles more than an anticipated distance value may be more indicative of quality than a second user who also travels two miles more than an anticipated distance value but does not take a path wherein he passes (or comes within a defined diversion distance of) any different Italian restaurants on his way to the Italian restaurant. For example, the actual distance value of the first user travelling two miles more than the anticipated distance value may be weighted more heavily in a quality measure determination in some implementations than would the second user also travelling two miles more than anticipated.

Also, for example, a first user who travels 10 minutes more than an anticipated distance value to visit a fine dining establishment may have had 20 other fine dining establishments that were closer to such user's starting location, 5 of which are highly rated. The first user travelling 10 minutes may be more indicative of quality than a second user who also travels 10 minutes more than an anticipated distance value but only has 8 fine dining establishments that were closer to such user's starting location, only 1 of which is highly rated. For example, the actual distribution value of the first user travelling 10 minutes more than anticipated may be weighted more heavily in a quality measure determination in some embodiments than that of the second user also travelling 10 minutes more than anticipated.

In some implementations the quality measure for a given location may be based on the time investment a user is willing to make to visit the given location and an identified rank of the given location. The rank is indicative of the number of competing locations bypassed by one or more users to reach the given location. As discussed herein, in some implementations such a rank may optionally be utilized in determining one or more anticipated distance values and/or actual distance values associated with a given location. In some implementations, the quality measure engine 120 may independently determine a rank associated with a given location and utilize such rank as a further basis for determining the quality measure for the location.

For example, in some implementations the rank for a given restaurant may be based on a number of competing restaurants within a certain distance of the given restaurant. For example, the rank for a given restaurant may be based on density of competing restaurants within five miles of the given restaurant. In some implementations the rank for a given restaurant may be based on user location data such as location data utilized to determine anticipated distance values and/or actual distance values. For example, data from users who indicate travel to a given location may be utilized to determine paths of the users and, for each path, how many competing locations were passed (or within a defined diversion distance) along the path. A greater number of competing locations passed may lead to a quality measure more indicative of quality for the location. Also, for example, data from users who indicate travel to a given location may be utilized to determine, for each user, a starting location of the user and how many competing locations were geographically closer to the user (time and/or distance) than the given location. A greater number of competing locations that were geographically closer to users may lead to a quality measure more indicative of quality for the given location.

The quality measure engine 120 may determine an additional quality measure for each of one or more identified additional locations. The additional quality measure for each of one or more locations in the additional locations may be determined by the quality measure engine 120 in a manner similar to the determination of the quality measure for the given location. The additional quality measures may be optionally stored in the content database 130 and/or provided to the ranking engine 150 for further processing. In some implementations, the quality measures may be mapped with respective locations in the content database 130.

In some implementations, the ranking engine 150 may optionally rank one or more locations based on the respective quality measures. For example, in response to a search for an Italian restaurant in downtown Chicago, the search engine 110 may identify a plurality of search results for various Italian restaurants in downtown Chicago. One or more of the search results may be ranked based at least in part on a quality measure based on time investment one or more users are willing to make to visit the respective search results, as described herein. For example, ratings from 1 to 5 may be provided in the search results, each accompanied with one of the Italian restaurants. The particular rating applied to one or more of the Italian restaurants may be based at least in part on time investment one or more users are willing to make to visit the respective search results. Also, for example, the display order of one or more of the Italian restaurants may be based at least in part on time investment one or more users are willing to make to visit the respective search results.

As another example, a star rating based at least in part on time investment one or more users are willing to make to visit a given Chinese restaurant may be displayed in response to a map based search that includes the given Chinese restaurant.

In some implementations, the quality measure and additional quality measure may be utilized by the ranking engine 150 to modify ratings and/or rankings related to the given location and the one or more additional locations. For example, a rating scheme may rate all the Italian restaurants in downtown Chicago based on other rating criteria, such as pure popularity signals, authoritative ratings, and user feedback. The ranking engine 150 may utilize the respective quality measures to boost the ratings of one or more of these restaurants, keep some ratings the same, and/or lower the ratings of others. The search engine 110 may utilize the modified ratings to identify one or more search result documents related to the location and/or to display in combination with one or more search results. In some implementations, the ranking engine 150 may rank search result documents responsive to a search query based at least in part on determined ratings.

In some implementations, the quality measure engine 120 may identify one or more user characteristics of the members in the population. These user characteristics may include one or more latent types that have no natural interpretation, or may be semantically meaningful types. For example, the members in the population may all be from a common age group, a common gender, and/or a common income class.

In some implementations, the quality measure engine 120 may select a group of members of the population based on whether they share the one or more desired user characteristics. For example, the desired user characteristics could be dog lovers, gamblers at a local casino, a particular age group, theater lovers, local church-goers, and/or fans of a particular college or professional basketball team. Accordingly, any determined quality measures may optionally be specific to a particular group. In some implementations, the quality measure engine 120 may determine a quality measure for a given location based on that particular selected group of members of the population. For example, anticipated distance values and/or actual distance values may be based only on data from a particular group.

In some implementations, the user characteristics may be used to link selected groups of members to a given location and/or particularize a quality measure for a location based on the user. For example, when a 25 year old searches for a restaurant to visit, the search engine 110 may search in the content database 130 to identify a list of relevant restaurants. In some implementations, these restaurants may have quality measures and/or additional quality measures associated with them that are specific to one or more user characteristics of the user.

In some implementations, the quality measure engine 120 may identify an actual distance value of one or more users to a given location based on a comparison of multiple user distance values associated with the given location. For example, in some implementations, a first distance value of a user may be indicative of actual time taken and/or distance traveled for the user to reach the given location from an initial location, and a second distance value may be indicative of actual time taken and/or distance traveled for the user to reach a final location from the given location. The quality measure engine 120 may utilize the first distance value and the second distance value to determine an actual distance value in visiting the given location. For example, assume a user who travels from location P1, to a given location P2, then to location P3. In some implementations the actual distance value traveled in reaching given location P2 may be determined as follows:

Actual Distance Value=[(distance from $P1$ to $P2$)+(distance from $P2$ to $P3$)]−(distance from $P1$ to $P3$)

or

Actual Distance Value=[(time from $P1$ to $P2$)+(time from $P2$ to $P3$)]−(time from $P1$ to $P3$)

Accordingly, the actual distance value for a user to the given location may be indicative of how far the user went out of his way in visiting the location. For example, assume a user leaves home (P1) in Milwaukee to travel to Gary, Ind. (P3) and diverts two miles or five minutes to eat at a restaurant (P2) in Chicago. The actual distance value for the user associated with P2 would be two miles or five minutes, since that is all the user diverted from the trip from P1 to P3 to visit P2. Also, for example, assume a user leaves home (P1) in Milwaukee, drives directly to a restaurant (P2) in Chicago, then travels directly back to home (P3) in Milwaukee. The actual distance value for the user associated with P2 would be based on the entire distance and/or time between the home in Milwaukee and the restaurant in Chicago, since that is all the user diverted from the trip from P1 to P3 to visit P2. In some implementations, each initial location is within a threshold of distance of each respective final location.

Also, for example, in some implementations, the quality measure engine 120 may identify an actual distance value of one or more users to a given location based on a comparison of multiple user distance values associated with the given location and one or more additional locations. For example, a first distance value of a user may be indicative of actual time taken and/or distance traveled for the user to reach a first given location from an initial location, a second distance value of a user may be indicative of actual time taken and/or distance traveled for the user to reach a second given location from the first given location, a third distance value of a user may be indicative of actual time taken and/or distance traveled for the user to reach a final location from the second given location. The quality measure engine 120 may utilize the first, second, and third distance values to determine an actual distance value in visiting the first given location and/or an actual distance value in visiting the second given location. For example, assume a user who travels from location P1, to a first given location P2, then to a second given location P3, then to a location P4. In some implementations the actual distance value traveled in reaching given locations P2 and P3 may be determined as follows:

Actual Distance Value=(distance from P1 to P2 to P3 to P4)−(distance from P1 to P4)]−(distance from P2 to P3)

or

Actual Distance Value=(time from P1 to P2 to P3 to P4)−(time from P1 to P4)]−(time from P2 to P3)

Accordingly, the actual distance value for a user to the first and second given locations (P2 and P3) may be indicative of how far the user went out of his way in visiting the locations. This actual distance value may be utilized to assign an actual distance value to the first given location and the second given location. For example, in some implementations the first given location may be assigned the actual distance value and the second given location may be assigned the actual distance value. In some implementations actual distance values for a given location that are split between one or more locations may be provided less weight in determining a quality measure. For example, actual distance values for a given location that are split between one or more locations may be weighted less heavily in determining an overall average actual distance value for the given location.

Also, for example, in some implementations the first given location may be assigned a percentage of the actual distance value and the second given location may also be assigned the other percentage of the actual distance value. For example, assuming the actual distance value for a user to the first and second given locations is ten minutes, five minutes may be assigned as the actual distance value for the first given location and five minutes may be assigned as the actual distance value for the second given location. Also, for example, in some implementations the first given location may be assigned a percentage of the actual distance value and the second given location may also be assigned a percentage of the actual distance value. For example, assuming the actual distance value for a user to the first and second given locations is ten minutes, eight minutes (80%) may be assigned as the actual distance value for the first given location and eight minutes (80%) may also be assigned as the actual distance value for the second given location.

In some implementations a weighting and/or distribution of the actual distance value between two or more given locations may be based on determination of importance of the given locations in the user's trip. For example, in some implementations the determination of importance for two locations may be based on a location characteristic of those locations such as location type. For example, assuming a first location is a restaurant and the second location is a theatre near the restaurant, it could be determined that the actual distance value may be weighted or distributed more heavily toward the theatre based on the theatre being the likely impetus for the restaurant visit.

Also, for example in some implementations the determination of importance for two locations may be based on additional data associated with the user who visited the two locations. For example, data from a user's social network profile may be utilized to determine that that the user discussed the first given location, but did not discuss the second given location. Accordingly, the first given location may be weighted more heavily than the second given location. Also, for example, the user may check in to the first given location via the social network but not check into the second given location, and the first given location weighted more heavily than the second given location. Also, for example, data from a user's search history and/or browsing history may be utilized to determine that the actual distance value should be weighted more heavily to and/or assigned a greater distribution to the first given location. For example, when the first given location is a restaurant and the user has viewed a menu of the restaurant and searched for reviews of the restaurant, it may indicate that the first given location should be weighted more heavily than the second given location.

As discussed herein, the quality measure for the given location may be based on the region characteristics of the given geographic region. For example, the anticipated distance value for the given location may be based on the density of a geographic region. For example, for a restaurant in a sparsely populated region, it may be expected that users would have to travel long distances to visit the restaurant. On the other hand, for a restaurant in a densely populated region, where the users have several choices for nearby restaurants, the anticipated distance values would be relatively low.

Any determined quality measures for a given location may be mapped with the given location in one or more databases such as, for example, the content database 130. In some implementations the content database 130 may be private and optionally not read accessible via the Internet. In some implementations, the quality measures and/or given location may optionally be mapped to one or more location characteristics and/or user characteristics. For example, in some implementations a quality measure may be determined based on members of a population in a common grouping and the quality measure may be mapped to that common grouping in the database.

Data of one or more databases such as content database 130 may optionally be utilized in determining a quality measure. For example, in some implementations content database 130 may include, for each of one or more locations: data indicative of actual distance values and/or anticipated distance values for the location. For example, for each of one or more locations content database 130 may include: an average distance and/or time traveled by a grouping of users to the location from an initial location and/or an average distance and/or time traveled by a grouping of users from the location to a final location. Also, for example, for each of one or more locations content database 130 may include: a distance and/or time traveled by each user of a grouping of users to the location from an initial location and/or distance and/or time traveled by each user of the grouping of users from the location to a final location. Also, for example, for each of one or more locations content database 130 may include: information about an initial location; information about a final location; information about a first location; information about a second location; a distance and/or time traveled by each user of a grouping of users to the first location from the initial location; a distance and/or time traveled by each user of a grouping of users to the second location from the first location; and/or distance and/or time traveled by each user of the grouping of users from the second location to the final location. The information about any location may include an identifier of the location such as an address, a latitude and longitude, a zip code, a neighborhood, and/or other identifier. Additional and/or alternative data structures may optionally be provided.

In some implementations data utilized to determine a quality measure for a given location may be based on one or more searches related to the given location. For example, in some implementations the search engine 110 may provide data in response to a user submitting a query. For example, in some implementations the data provided by the search engine 110 may be identified in response to direction queries issued to a mapping service. In some implementations, direction queries may provide a signal of the user's intent to visit a given location. For example, in some implementations, actual distance values may be based on anonymized direction queries issued to the search engine 110. For example, for a given location, distances and/or times between an initial location and the given location and/or the given location and a destination location may be provided by the search engine 110 for storage in a database such as content database 130. For example, a log of direction queries may be stored that includes the source location of the direction query, the destination location of the direction query, and an indication of the distance and/or duration of travel from the source to the destination. The indication of the distance and/or duration of travel from the source to the destination may be based on, for example, a determined distance and/or duration of travel as determined by a mapping service. In some implementations any determined duration of travel may optionally take into account travel conditions at the time of the navigational query and/or after the navigational query. In some implementations any data associated with a direction query of a user may contain more than two locations. For example, in some implementations the user may seek directions from point A to point B to point C. Also, for example, in some implementations the user may seek directions from point A to point B then seek directions from point B to point C, indicating a likelihood of traveling from point A to point B to point C.

In some implementations any utilized direction queries may optionally be verified based on additional data to increase a confidence level that the user will actually travel from the source location to the destination location. For example, geolocation data from a mobile device of a user associated with the direction query may be utilized to verify that the user actually went from the source location to the destination location. Also, for example, data from a user's social network profile may be utilized to verify that the user went from the source location to the destination location. For example, the user may check in to the destination location via the social network, and/or may post a comment related to the destination location. Also, for example, data from a user's search history and/or browsing history may be utilized to verify that the user will actually travel from the source location to the destination location. For example, when the location is a restaurant and the user searches for and/or views a menu of the restaurant after issuing a direction query for the restaurant, it may indicate that the user will actually travel from the source location to the destination location.

Also, for example, in some implementations the data may include data based on a navigation system providing active navigational direction from a destination to a source. For example, for a given location, distances and/or times between an initial location and the given location and/or the given location and a destination location may be provided by the navigation application for storage in a database such as content database 135. For example, a log of actual navigations may be stored that includes the source location of the navigations, the destination location of the navigations, and an indication of the distance and/or duration of travel from the source to the destination. The indication of the distance and/or duration of travel from the source to the destination may be based on, for example, actual distance and/or duration of travel as provided by the navigation application. Additional locations between the source and destination may further be provided in one or more datasets (e.g., additional intermediary locations).

In some implementations any source and/or destination location data may specify a location in the form of a latitude, longitude pair. In some implementations any source and/or destination location data may specify a location in the form a textual address, for example, "123456 Example Road, Cupertino, Calif. 94087" or "Example Restaurant 94087".

In some implementations, information related to anticipated distance values and/or an actual distance values may be additionally and/or alternatively identified based on geolocation data from personal electronic devices of users. For example, geolocation data may be identified from a mobile phone as a user moves with the mobile phone. For example, geolocation data may be provided by the mobile phone at certain time intervals as a user moves with the mobile phone. Geolocation data may be utilized to determine a user traveled between two or more locations and/or may be utilized to verify other sources such as, for example, the navigational queries described herein. Geolocation data may be based on, for example, one or more of GPS data, cellular tower data, and/or Wi-Fi data.

Figure 2:
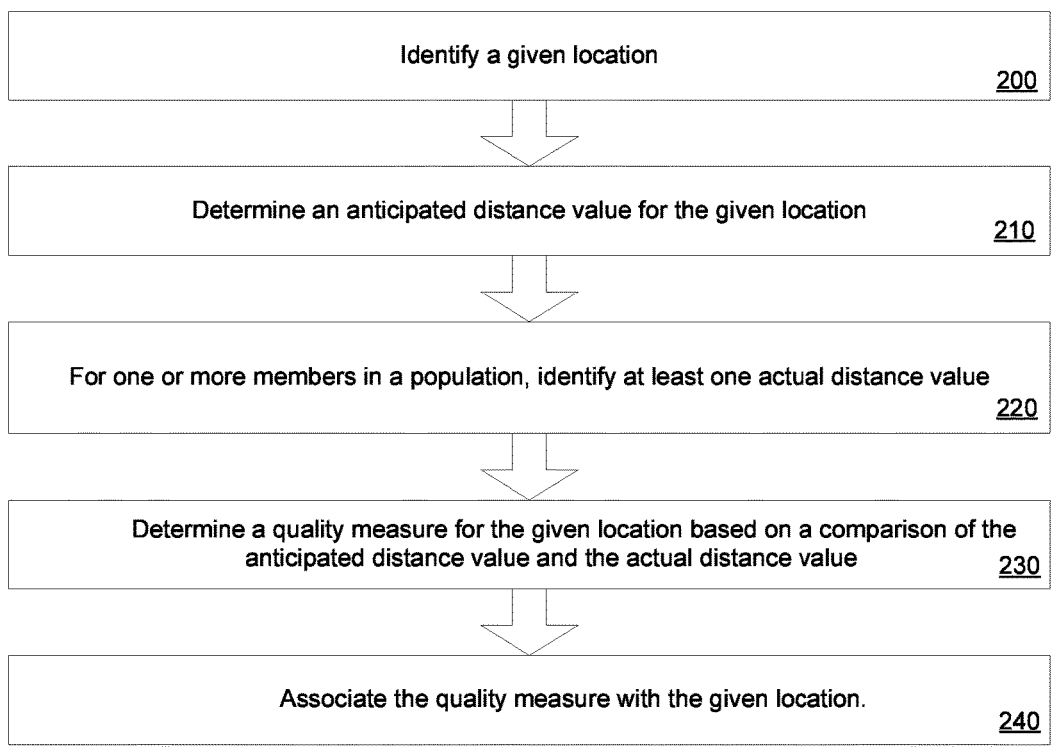
FIG. 2 is a flow chart illustrating an example method of determining a quality measure of a location.
Figure 3:
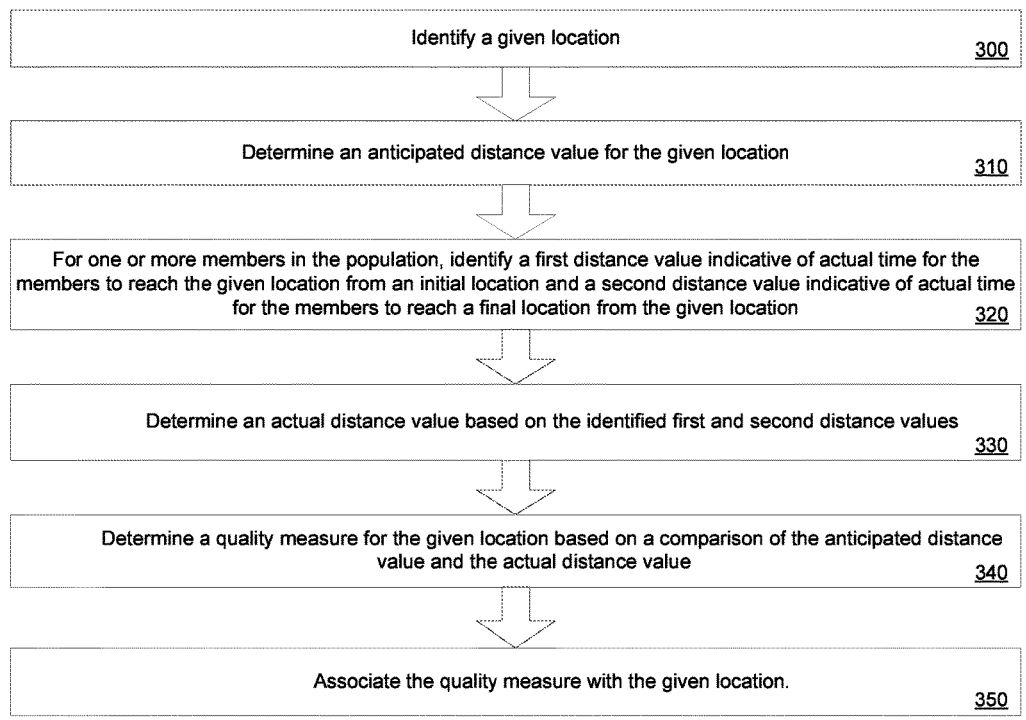
FIG. 3 is a flow chart illustrating another example method of determining a quality measure of a location.

In some implementations the search engine 110 and/or the quality measure engine 120 may perform one or more of the steps of the method of FIG. 2 such as steps 200, 210, and/or 220, and/or one or more of the steps of the method of FIG. 3 such as steps 300, 310, 320 and/or 330. The search engine 110 and/or the quality measure engine 120 may be implemented in hardware, firmware, and/or software running on hardware. For example, the search engine 110 and/or the quality measure engine 120 may be implemented in one or more computer servers.

In some implementations any database may optionally include time data indicative of a duration of a visit to a given location. The time data indicative of a duration of a visit to a given location may optionally be utilized to identify the type and/or purpose of a visit. For example, a two minute stop at a restaurant may indicate that the user picked up a carry-out order and/or that the user left the restaurant due to a long wait and/or other reason. A two minute stop may alternatively indicate that the user left the restaurant. This data may be correlated with any data related to anticipated distance values and/or actual distance values to weight such data. For example, location data may not be utilized in determining an actual value or may be lightly weighted if it is data indicating a visit may have occurred outside the restaurant's hours of operations or the restaurant may have been be filled to capacity.

The search engine 110 may receive a user's query related to a location from a computing device 140, and execute the search query against a database of collection of documents such as web pages, images, text documents, and multimedia content to produce search results. The collection of documents may be stored in the content database 130, and/or on multiple computers and/or storage devices. A document in the collection of documents in the content database 130 may be a web page, a word processing document, a portable document format (PDF) document, or any other type of electronic document. In some implementations, the collection of documents in the content database 130 may be obtained from the World Wide Web. The search results may identify a ranked list of search result documents in the collection of documents in the content database 130 that are relevant to the user's query.

In some implementations, the search engine 110 may use quality measures for one or more locations to rank the search results. For example, one or more search results may be associated with a given location. In some implementations, the search results may be additionally ranked based on a quality measure for the given location. The ranking engine 150 may rank the search result documents based at least in part on the quality measure and provide the ranked list to the search engine 110 or directly to the computing device 140, and/or for display on the browser 145.

In some implementations, the search engine 110 may provide the list of search result documents to the ranking engine 150 to determine a ranking for the given location relative to other locations. In some implementations, the search engine 110 may obtain a quality measure for the given location from the quality measure engine 120 and/or the content database 130. The search engine 110 may provide a search results page and/or provide search result documents that include information related to the given location, including the quality measure for the given location and/or information related to additional locations and/or a ranking of the given location relative to the additional locations. The search results page and search result documents may be displayed in the web browser 145 or other application executing on the client computing device 140.

Many other configurations are possible having more or fewer components than the environment shown in FIG. 1. For example, in some environments the content database 130 may be omitted. Also, for example, in some environments one or more of the ranking engine 150, the search engine 110, and the quality measure engine 120 may be combined. In some implementations, the search engine 110 and/or the ranking engine 150 may be omitted.

Referring to FIG. 2, a flow chart illustrates an implementation of determining and associating a quality measure with a given location. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the search engine 110, the quality measure engine 120, and/or the ranking engine 150 of FIG. 1.

At step 200, a given location is identified. In some implementations, the given location may be identified via the content database 130. For example, in some implementations, the given location may be identified based on a log of direction queries stored in content database 130 that were initiated by a user at a computing device 140.

At step 210, the system determines an anticipated distance value for the given location. For example, the anticipated distance value may be determined via content database 130. In some implementations, the anticipated distance value may be indicative of the anticipated time it would take to reach the given location. For example, as discussed herein, the anticipated distance value for a given location may be based on actual distance values to other locations that are similar to the given location (e.g., same neighborhood, same zip code, similar cuisine, similar price range), one or more geographic characteristics associated with the given location (e.g., population density, transportation options, density of competing locations), and/or one or more location characteristics associated with the given location itself (e.g., restaurant type, price range, cuisine).

At step 220, for one or more members in a population, at least one actual distance value is identified. For example, the at least one actual distance value may be determined via content database 130. In some implementations, the actual distance value may indicative of indicated and/or verified investment by one or more users to reach the given location. For example, as discussed herein, one or more actual distance values for a given location may be based on a navigational query to or from the given location, one or more actual navigations to or from the given location, and/or one or location data from mobile devices of users. In some implementations an actual distance value is identified that represents a summary of actual distance values for a plurality of users. For example, the actual distance value for a given location may be an average or a mean of actual distance values from a plurality of navigational queries associated with the given location. In some implementations a plurality of actual distance values are identified that each represent actual distance values for one or more users. For example, one or more actual distance values for a given location may include a time and/or distance associated with a navigational query of a single user to/from the given location. Also, for example, one or more actual distance values for a given location may include a summary of time and/or distance associated with a group of navigational queries (e.g., those originating/ending in the same geographic region, those associated with a grouping of users with similar characteristics).

At step 230, the anticipated distance value is compared to one or more actual distance values to determine a quality measure. In some implementations the quality measure engine 120 compares the anticipated distance value to the one or more actual distance values. The anticipated distance value may be compared to the actual distance values in a variety of ways. For example, in some implementations the anticipated distance value may be individually subtracted from each of the actual distance values, then a mean or median of the differences determined. Also, for example a mean or median of the actual distance values may be determined and the anticipated distance value may be subtracted from such mean or median. Also, for example, in some implementations the anticipated distance value may be individually subtracted from the each of the actual distance values, and one or more groupings of the differences identified.

At step 240, the quality measure is associated with the given location. The quality measure may be optionally stored in the content database 130 and/or forwarded to the ranking engine 150 for further processing. As discussed herein, in some implementations the quality measure determined based on time investment for a given location may optionally be combined with other signals related to quality such as, for example, user reviews, pure popularity signals, etc.

Referring to FIG. 3, a flow chart illustrates another implementation of determining and associating a quality measure with a given location. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the search engine 110, the quality measure engine 120, and/or the ranking engine 150 of FIG. 1.

At step 300, a given location is identified. In some implementations, step 300 may share one or more aspects in common with step 200 of FIG. 2.

At step 310, an anticipated distance value for the given location is identified. In some implementations, step 310 may share one or more aspects in common with step 210 of FIG. 2.

At step 320, for one or more members in the population, the system identifies one or more sets of a first distance value and a second distance value. The first distance value is indicative of actual and/or indicated time to reach the given location from an initial location, and the second distance value is indicative of actual and/or indicated time to reach a final location from the given location. In some implementations additional and/or alternative distance values may be determined. For example, additional distance values may be determined from a given location to an additional given location.

At step 330, the system may determine an actual distance value based on the identified first and second distance values. In some implementations, this may be determined based on:

Actual Distance Value=[(first distance value)+(second distance value)]−(distance from the initial location to the final location)

At step 340, a quality measure for a given location may be determined based on the incremental investment values. The quality measure may be optionally stored in the content database 130 and/or forwarded to the ranking engine 150 for further processing. As discussed herein, in some implementations the quality measure determined based on time investment for a given location may optionally be combined with other signals related to quality such as, for example, user reviews, pure popularity signals, etc.

In some implementations a quality measure may be determined for a given location utilizing both the method of FIG. 2 and the method of FIG. 3. For example, in some implementations data for a given location may include some data for a given location that includes a first distance value and a second distance value for a user to the given location and other data that only includes a single actual distance value (e.g., to or from the location).

At step 350, the quality measure engine 120 associates the quality measure to the given location. The quality measure may be optionally stored in the content database 130 and/or forwarded to the ranking engine 150 for further processing.

Figure 4:
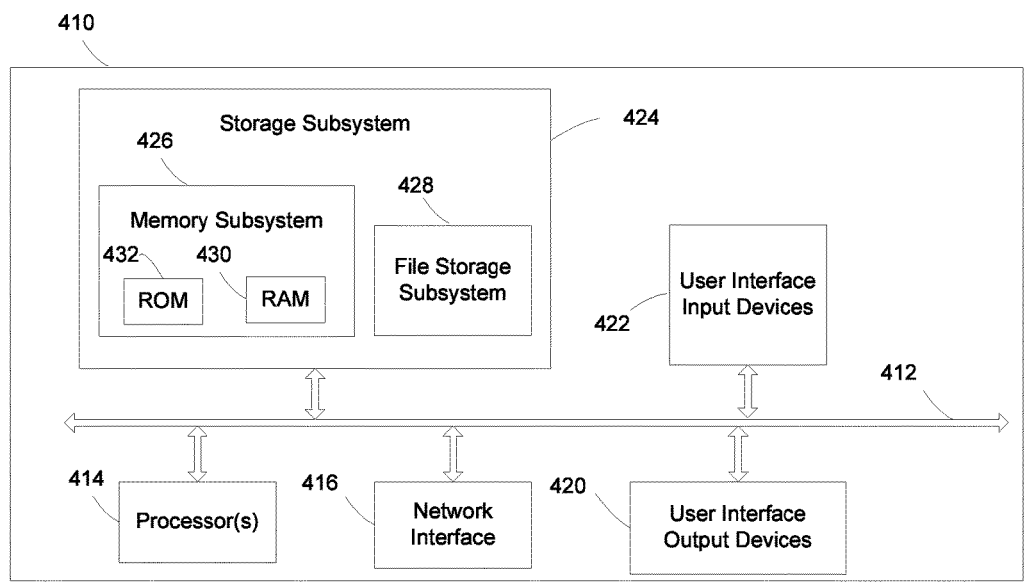
FIG. 4 illustrates a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 426 and a file storage subsystem 428, user interface input devices 422, user interface output devices 420, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to determine the quality measure of a given location based on the time investment one or more users is willing to make to visit the given location.

These software modules are generally executed by processor 414 alone or in combination with other processors. Memory 426 used in the storage subsystem can include a number of memories including a main random access memory (RAM) 430 for storage of instructions and data during program execution and a read only memory (ROM) 432 in which fixed instructions are stored. A file storage subsystem 428 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 428 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more locations. It should also be understood that, unless clearly indicated to the contrary, all data pertinent to users is appropriately anonymized.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method, comprising:
   identifying a given location;
   identifying at least one anticipated distance value for the given location, wherein the anticipated distance value is indicative of anticipated time to reach the given location and is determined based on one or both of travel times and travel distances of travel of users to other locations that share one or more characteristics with the given location;
   identifying, for members in a population with indicated travel to the given location, at least one actual distance value, wherein each actual distance value is indicative of actual time for one or more of the members to reach the given location;
   determining a quality measure for the given location based on a comparison of the anticipated distance value and the identified actual distance value, wherein the quality measure is determined based on a size of the difference between the anticipated distance value and the actual distance value;
   associating the quality measure with the given location;
   identifying an additional location;
   determining an additional quality measure for the additional location;
   identifying, in response to a query submitted via a computing device, a plurality of search results for the query, the search results including a first search result related to the given location and a second search result related to the additional location;
   ranking the search results, including ranking the first search result and the second search result based on the quality measure and the additional quality measure; and
   providing the ranked search results in response to the query.

2. The method of claim 1, further comprising:
   identifying a geographic region of the given location;
   identifying at least one region characteristic of the geographic region.

3. The method of claim 2, wherein the region characteristic includes a population density of the region.

4. The method of claim 2, wherein determining the quality measure for the given location is based on the region characteristic of the geographic region.

5. The method of claim 2, further comprising determining the anticipated distance value based on the region characteristic of the geographic region.

6. The method of claim 1, further comprising:
identifying one or more location characteristics of the given location;
determining the anticipated distance value for the given location based on the one or more location characteristics.

7. The method of claim 1, further comprising:
identifying one or more user characteristics; and
selecting the members of the population based on whether they share the one or more user characteristics.

8. The method of claim 7, wherein the one or more user characteristics include at least one of a semantically meaningful characteristic and a latent characteristic.

9. The method of claim 1, further comprising:
identifying a first distance value and a second distance value, wherein the first distance value is indicative of actual time for the one or more members to reach the given location from an initial location, and the second distance value is indicative of actual time for the one or more members to reach a final location from the given location; and
determining the actual distance value based on the first and second distance values.

10. The method of claim 9, wherein determining the actual distance value includes comparing the first and second distance values to an initial to final distance value, the initial to final distance value based on difference between the initial location and the final location.

11. The method of claim 9, further comprising:
identifying a third distance value for the one or more members in the population for which the first distance value and the second distance value are identified, wherein the third distance value is indicative of actual time for the one or more members to reach a second given location from the given location; and
determining the actual distance value based on the first, second, and third distance values.

12. The method of claim 11, further comprising:
identifying a second anticipated distance value for the second given location;
identifying a second location actual distance value for the second given location based on the actual distance value;
determining a quality measure for the second given location based on a comparison of the second anticipated distance value and the identified second location actual distance value;
associating the quality measure with the second given location.

13. The method of claim 1, wherein the anticipated distance value and the actual distance value are time values.

14. The method of claim 1, wherein:
the anticipated distance value includes an indication of the anticipated number of individuals that would travel an anticipated time range to reach the given location;
the actual distance value includes an indication of the actual number of the one or more members that traveled the anticipated time range to reach the given location; and
wherein determining the quality measure for the given location is based on a comparison of the anticipated number of individuals that would travel the anticipated time range to reach the given location and the actual number of the one or more members that traveled the anticipated time range to reach the given location.

15. The method of claim 1, further comprising:
identifying, for one or more of the members, a rank indicative of the number of competing locations bypassed to reach the given location; and
wherein the determining the quality measure for the given location is further based on the identified rank.

16. A system, comprising:
a non-transitory computer readable storage medium storing instructions; and
one or more processors operable to execute the instructions stored in the non-transitory computer readable storage medium, wherein execution of the instructions by the one or more processors causes the one or more processors to:
identify a given location;
identify at least one anticipated distance value for the given location, wherein the anticipated distance value is indicative of anticipated time to reach the given location and is determined based on one or both of travel times and travel distances of travel of users to other locations that share one or more characteristics with the given location;
identify, for members in a population with indicated travel to the given location, at least one actual distance value, wherein each actual distance value is indicative of actual time for one or more of the members to reach the given location;
determine a quality measure for the given location based on a comparison of the anticipated distance value and the identified actual distance value, wherein the quality measure is determined based on a size of the difference between the anticipated distance value and the actual distance value;
associate the quality measure with the given location;
identify an additional location;
determine an additional quality measure for the additional location;
identify, in response to a query submitted via a computing device, a plurality of search results for the query, the search results including a first search result related to the given location and a second search result related to the additional location;
rank the search results, including ranking the first search result and the second search result based on the quality measure and the additional quality measure; and
provide the ranked search results in response to the query.

17. The system of claim 16, wherein the instructions further include instructions to:
identify one or more location characteristics of the given location;
determine the anticipated distance value for the given location based on the one or more location characteristics.

18. The system of claim 16, wherein the instructions further include instructions to:
identify a first distance value and a second distance value, wherein the first distance value is indicative of actual time for the one or more members to reach the given location from an initial location, and the second distance value is indicative of actual time for the one or more members to reach a final location from the given location; and determine the actual distance value based on the first and second distance values.

19. The system of claim 18, wherein the instructions to determine the actual distance value include instructions to compare the first and second distance values to an initial to final distance value, the initial to final distance value based on difference between the initial location and the final location.

20. The system of claim 18, wherein the instructions further include instructions to:

identify a third distance value for the one or more members in the population for which the first distance value and the second distance value are identified, wherein the third distance value is indicative of actual time for the one or more members to reach a second given location from the given location; and determine the actual distance value based on the first, second, and third distance values.

21. The system of claim 16, wherein:

the anticipated distance value includes an indication of the anticipated number of individuals that would travel an anticipated time range to reach the given location;

the actual distance value includes an indication of the actual number of the one or more members that traveled the anticipated time range to reach the given location; and wherein the instructions to determine the quality measure for the given location include instructions to determine the quality measure for the given location based on a comparison of the anticipated number of individuals that would travel the anticipated time range to reach the given location and the actual number of the one or more members that traveled the anticipated time range to reach the given location.

22. The system of claim 21, wherein the instructions further include instructions to:

identify, for one or more of the members, a rank indicative of the number of competing locations bypassed to reach the given location; and wherein the instructions to determine the quality measure for the given location include instructions to determine the quality measure for the given location further based on the identified rank.

23. A non-transitory computer readable storage medium storing computer instructions executable by a processor to perform a method comprising:

identifying a given location;

identifying at least one anticipated distance value for the given location, wherein the anticipated distance value is indicative of anticipated time to reach the given location and is determined based on one or both of travel times and travel distances of travel of users to other locations that share one or more characteristics with the given location;

identifying, for members in a population with indicated travel to the given location, at least one actual distance value, wherein each actual distance value is indicative of actual time for one or more of the members to reach the given location;

determining a quality measure for the given location based on a comparison of the anticipated distance value and the identified actual distance value, wherein the quality measure is determined based on a size of the difference between the anticipated distance value and the actual distance value;

associating the quality measure with the given location;

identifying an additional location;

determining an additional quality measure for the additional location;

identifying, in response to a query submitted via a computing device, a plurality of search results for the query, the search results including a first search result related to the given location and a second search result related to the additional location;

ranking the search results, including ranking the first search result and the second search result based on the quality measure and the additional quality measure; and providing the ranked search results in response to the query.

* * * * *